SEMIPERMANENT MAGNETIC CORE STORAGE MATRICES

Filed Oct. 16, 1964 2 Sheets-Sheet 1

INVENTOR.
GERHARDUS B. VISSCHEDIJK
BY
Frank R. Trifari
AGENT

SEMIPERMANENT MAGNETIC CORE STORAGE MATRICES

Filed Oct. 16, 1964 2 Sheets-Sheet 2

INVENTOR.
GERHARDUS B. VISSCHEDIJK
BY
Frank R. Trifari
AGENT

United States Patent Office 3,508,214
Patented Apr. 21, 1970

3,508,214
SEMIPERMANENT MAGNETIC CORE STORAGE MATRICES

Gerhardus Bernardus Visschedijk, Hengelo, Overijsel, Netherlands, assignor to N.V. Hollandse Signaalapparaten, Hengelo, Overijsel, Netherlands Filed Oct. 16, 1964, Ser. No. 404,293
Claims priority, application Netherlands, Oct. 18, 1963, 299,494
Int. Cl. G11c *17/00, 5/04*
U.S. Cl. 340—174 13 Claims

ABSTRACT OF THE DISCLOSURE

A magnetic core storage matrix having means for disabling selected core of the matrix. The disabling means includes a plurality of notched magnetic bars on the upper side of the matrix having teeth aligned with and projecting close to the selected cores. A soft iron plate extends along the lower side of the matrix adjacent the cores. A magnetic circuit including magnetizing means for producing a magnetic flux completes a magnetic path that includes the notched bars, selected cores and the iron plate. The magnetic flux saturates the selected cores so that they do not respond to input signals applied to the drive lines of the matrix.

This invention relates to magnetic core storage matrices and more particularly to storage matrices in which selected cores are made inoperative by inducing a strong magnetic field therein.

In Belgian patent specification No. 627,326 there is described a matrix in which preselected cores are made inoperative as storage means by placing small magnets in their immediate vicinity. These small magnets induce such a strong field in the cores that the driving currents in the wiring of the matrix cannot change the flux in these cores by more than a very small amount. Consequently, when these inoperative cores are read out, they will induce at most voltage pulses of a smaller magnitude in the corresponding reading wires than the magnitude of voltage pulses induced in the read-out circuit by operative cores. The read-out circuit is arranged to react only to pulses received from the operative cores.

It will be appreciated that by rendering predetermined ones of the cores inoperative, a predetermined pattern of storage states are set in the matrix. These predetermined states are hereinafter referred to as fixed registrations.

The above method for arranging fixed registrations has various disadvantages. In a matrix of normal size a very large number of permanent magnets is required. On the average, such a matrix needs one magnet for every two cores. Consequently, the total expense for providing all the magnets for a matrix is relatively high. Furthermore, the dimension of these magnets are small whereas in many types of matrices the total length of the air gaps in the magnetic circuits which include the cores is relatively large. As a result, it is difficult to maintain a strong magnetization of these magnets for a long time. Since each bit in a word is set separately either by placing or by not placing a magnet in the vicinity of the core which is to store a bit the risk of making errors when setting the matrix is very high because each magnet must be located in a predetermined position.

It is therefore an object of the present invention to provide an improved magnetic core storage matrix which mitigates one or more of the above disadvantages.

We therefore provide a magnetic core storage matrix comprising a plurality of magnetic cores, a plurality of drive lines for setting one or more of said cores to a predetermined magnetic state, a plurality of read-out lines for sensing a change in the magnetic state of one or more of said cores, and a magnetic circuit including at least one member having high magnetic permeability located adjacent predetermined ones of said cores, and means for inducing a magnetic flux in said circuit and said member to render the predetermined ones of said cores inoperative for setting by said drive lines.

Preferably the member is in the form of a notched bar made out of a material with high magnetic permeability. The bar is located along a row of cores so that the projections or teeth adjacent the notches of the member extend into the immediate vicinity of the cores to be made inoperative. At least one end of the notched bar is connected by way of a low reluctance path to the magnetic flux inducing means, which may be a permanent magnet.

The matrix can be built in such a way that a corresponding to a complete word can be placed into the matrix to set into predetermined ones of the cores a complete word without affecting other cores required for setting other words. The bar may be prepared for insertion into the matrix by starting from a bar provided with teeth spaced at intervals corresponding to the spacing of the cores in a row or column. By means of a tweezer or a small punching machine, we remove all teeth which would be located adjacent cores which must remain operative. An alternative method of constructing the bar is to start with a flat strip and cut or punch out notches to provide projections or teeth to register with those cores which are to be made inoperative. The risk of making errors in providing a predetermined pattern of inoperative cores is substantially reduced because it is easy to check a bar which has been prepared for setting a certain word before it is inserted into the matrix. If desired, bars for setting certain words may be kept in stock so that they may be placed in the matrix when desired. Moreover, a machine for cutting or punching notches in or teeth from the strip can be provided with a sledge which can be shifted along a straight guide. A pointer and scale are provided to read the position of the strip so that the sledge can be adjusted to a position at which a predetermined tooth or a predetermined part of the strip can be removed. It is, however, not necessary for a notched bar to correspond to a complete word. In certain cases certain bits of different words are always changed simultaneously. In these cases it may be desirable to arrange the bars, the cores and the wiring in such a way that cores corresponding to the bits which are to be changed simultaneously will be situated under the same notched bar. It is important for each core to be situated in an exactly defined position in the matrix so that when the member is inserted into the matrix the magnetic field is led through the teeth to the cores to be made inoperative, and not to those cores which are to be set by the drive lines. In the matrix disclosed in the aforementioned Belgian patent, the cores are situated in openings of a plate of insulating material, such as pertinax, onto which these cores and the wiring are glued. Since the magnetic fields are generated by means of separate magnets it is not necessary to precisely position the cores. Differences in the positions of the cores can be compensated by thrusting the magnets to different extents into the openings in a supporting plate. This type of compensation is not practical if the magnetic field flows to the cores by way of a notched bar because, as a rule, the end of the teeth of such a bar are located in a straight line. In this case as a result of small but unavoidable divergences in the positions of the cores on the supporting plate, these cores will not be located at places corresponding to the positions of the ends of the teeth. On the one hand, a magnetic core which protrudes too far from its supporting plate will be broken when the notched bar is introduced into the matrix, especially if the cores are ring cores that are mechanically weak. On the other hand, the distance between certain teeth on the notched bar and certain cores, which in the direction perpendicular to the supporting plate are situated too far from the bar, might become too large with the result that the field in such a core would become too weak for rendering the core inoperative. In order to avoid these complications, the matrix according to a preferred embodiment of the present invention, hereinafter to be described in detail, is built in such a way that each core is supported in a recess of a supporting resilient layer which rests against a plate of high magnetic permeability. The recesses determine precisely the location of the cores in the matrix while the resiliency of the layer permits the cores to be slightly moved into the cavities by the teeth of a notched bar without broken or damaged. In order that the magnetic circuit may have a small reluctance, the layer preferably contains fine iron powder or iron compound powder.

The invention is very suitable for application in the well known type of matrix having two cores per bit. In such a matrix on each row registering a word, half of the cores must be made inoperative. As a result, half of the teeth are removed from the notched bar which effects the setting of the word. If fixed registrations are present on all rows, half of the cores of the matrix are provided with magnetic circuits carrying strong flux to them. At the same time, because the reluctance of the magnetic circuit is substantially independent of the position of the core to which it leads the flux, the total reluctance of the parallel magnetic circuits will be the same for all possible combinations of words. Under these circumstances it is possible to provide magnets with a magneto-motive force which is strong enough to disable each core which must be inoperative. On the other hand, the operation of cores which must remain operative is not endangered by strong stay fluxes. This will also be the case if fixed registrations must be present on a predetermined number of rows of the matrix. Difficulties may arise if fixed registrations must be made on a variable number of rows and the remaining part of the matrix must be available for storing variable words, so that no notched bars may be present in this remaining part, not even bars the only task of which is to reduce the total reluctance. Similar objections will be met if the matrix possesses only one core per bit. Then the number of cores which must be made inoperative in a matrix of a given size will depend on the combination of fixed words. If for a certain combination of fixed words the number of inoperative cores is large, then it may be that in some of the cores to be made inoperative the field will be too weak to reliably produce the inoperative condition. If, on the other hand, the number of cores to be made inoperative is relatively low, then it may be that the reluctance in the magnetic circuit through this limited number of cores is so high that a large stray flux will occur and endanger the correct operation of the operative cores. Under certain conditions similar difficulties may occur in the vicinity of a notched bar, which in comparison to the average number of teeth per bar, possesses an extremely low or an extremely high number of teeth, even if the total reluctance of the complete magnetic circuit of the matrix does not differ substantially from the value to which the magnets are adapted. In order that in such cases a reliable operation of the matrix also may be obtained, magnetic shunts are applied in the matrix. The operation of these shunts will be described below.

In a matrix according to a further preferred embodiment of the invention, the two ends of a notched bar rest in slots of supporting bars consisting of material having high magnetic permeability and situated near opposite edges of the matrix. Each of the magnets rests with one pole against, or is connected by way of a path with low reluctance to, a supporting bar, and has its other pole connected by way of a path with low reluctance to a system having high magnetic permeability. In small matrices one or more magnets and one or more supporting bars with slots situated near one of the edges of the matrix may suffice. In this case, each notched bar has its opposite end located in a slot or the like in an auxiliary supporting bar of non-magnetic material or which, at any rate, is not connected to the system having high magnetic permeability through a path of low reluctance. It is also possible to divide a matrix into two parts and to locate the magnet or magnets and the supporting bar or bars, which in this case are provided with slots on either side, between the two parts of the matrix. In this construction the notched bars will stretch from both sides of the supporting bar(s) and are supported near the edges of the matrix in a manner similar to the matrix in which the magnets are situated only near one edge.

Preferably, the magnets which supply the field for making cores inoperative are permanent magnets. Electromagnets may, however, also be used for this purpose.

The invention will now be elucidated by describing, by way of example, a number of embodiments with reference to the accompanying drawings, in which.

Figure 1:
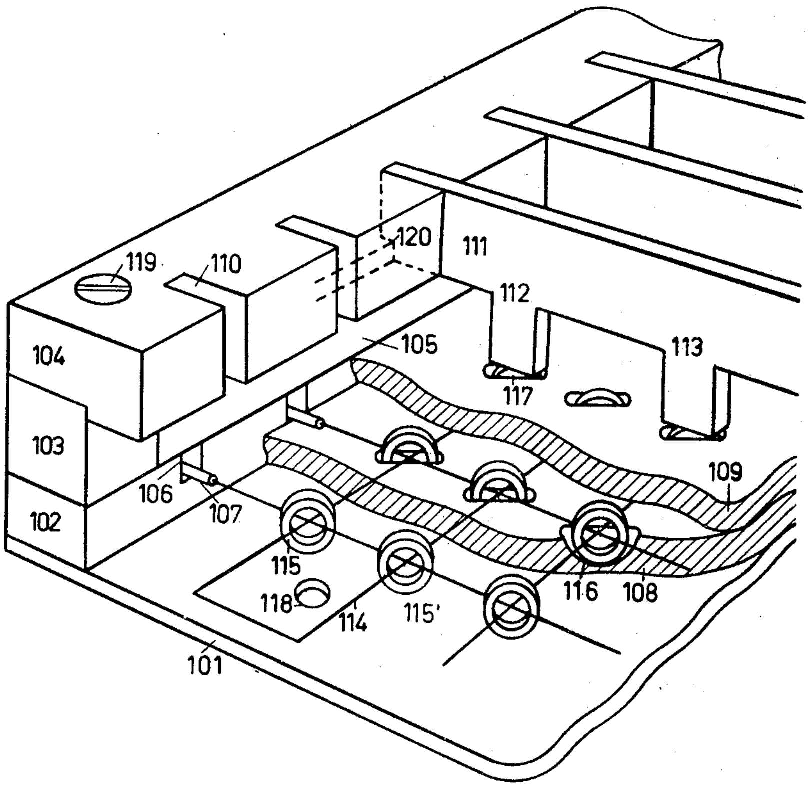
FIGURE 1 shows in perspective a small part of a matrix according to the invention.

FIGURE 1 shows a small part of a matrix according to a preferred embodiment of the present invention. It is assumed that this matrix comprises 64 rows, each provided with 64 magnetic cores for registering one word of 32 bits, two cores being used to register a single bit. The complete matrix is supported by a soft iron bottom plate 101 which constitutes a system having high magnetic permeability. This plate carries, adjacent each of two opposite edges thereof, a soft iron bar 102, only one bar 102 being shown in FIGURE 1. Furthermore, FIGURE 1 shows only nine of the 4096 cores, of which is designated by the reference numeral 115. The rows of cores are arranged at right angles to the bars 102. Selection lines, such as wire 107, are passed through all the cores of a row and leave the matrix through slots 106 in the bars 102. The cores are also arranged in columns in the well-known way, so that all the cores in a column are situated on a line which is parallel to the bars 102. Read wires 114 pass through all the cores of a column. A resilient plastic layer 108, shown in cut-away section, rests on the bottom plate 101. Silicone rubber, to which fine iron powder or fine powder of an iron compound is added, is a very suitable material for making this layer. The plastic layer is maintained in a fixed position with respect to the matrix by means of projections on its lower side which enter openings 118 in the bottom plate 101. The layer 108 is provided with recesses 116 for locating the cores 115 so that each of the latter rests on a thin layer for the resilient material. A layer 109 entirely covers the wires 107 and 114 and consists of a flexible plastic such as silicone rubber. The layer 109 is provided with a pattern of openings 117 through which the cores protrude. The pattern of openings 117 correspond to the pattern of recesses in the layer 108. The layer 109 is thinner than the layer 108 and the openings 117 provide a snug fit for each of the cores 115. This layer also is shown in cut-away section, so that the location of some of the cores and a part of the wiring is visible. Mounted on each end of each bar 102 is a brass block 103. A moulded soft iron bar 104 of high magnetic permeability is mounted on the two brass blocks belonging to the same bar 102. The bar 104, the brass blocks 103 and the bar 102 are fixed to the bottom plate 101 by means of brass screws 119. A bar 105 consisting of magnetic material with high coercive force is mounted between the bar 102 and the moulded bar 104. The bar 105 is magnetized in a direction transverse to its length and to the plane in which the bottom plate 101 lies. The bar 104 possesses slots 110, above and in alignment with each of the rows of cores. The inner part of the slots are located above the magnetized bar 105. A structure (not shown) similar to that formed by the bars 102, 104 and 105 and brass blocks 103 is mounted on the matrix opposite to and parallel with the aforementioned bars and blocks. Oppositely facing bars 104 are so mounted that the slots therein are in alignment with each other and with the rows of cores, so that a straight notched bar 111 can be inserted into two oppositely located slots. At each end of the notched bar 111 there is a cut-away portion 120 which allows the bar 111 to rest on the edge of the magnetized bar 105 and thereby prevent lengthwise movement of the bar in the slots and limits its movement towards the cores. The slots thus define the position of the notched bar in the matrix and the cut-away portions 120 allow the ends of the teeth of the bar to rest against, or to be situated in the immediate vicinity of, the cores protruding from the covering layer 109. By limiting the movement of the bar 111 towards the cores, the latter are prevented from being damaged. The bar 111 is provided with teeth spaced apart by a distance corresponding to the distance between successive cores in a row. Teeth which would be adjacent cores that are to remain operative are removed from the bar 111 by means of a tweezing implement or a punch, leaving teeth 112 and 113 which, on insertion of the bar 111, cause the cores adjacent thereto to be inoperative. Magnetic flux from the magnet 105 thus flows through the bar 104, the notched bar 111, the teeth 112 and 113, the cores 115 in the openings 117, the iron powder in the thin layer of plastic below the cores, the soft iron bottom plate 101 and the soft iron bar 102 back to the magnet 105. In this magnetic circuit the permanent magnet can maintain a high induction in the cores because the air gaps in this circuit are short. As a rule, a tooth such as 112 will rest on the core without damage thereto since the latter slightly compresses the elastic material of the layer 108 situated between the core and the plate 101.

Moreover, depression of the notched bar is limited by the recesses 120 engaging the corner of the magnet 105. Consequently, at the point where the magnetic field passes from a tooth to a core, the reluctance is low. Also, at the point where the field passes from the core to the bottom plate 101, it experiences only a low reluctance because the thickness of the layer 108 is very small, and because of the iron powder therein. The way in which a matrix having two cores per bit is read-out is well-known in the art. This method for reading out is described, for instance, in Meyerhoff, Barnes, Disson, Lund, "Digital Applications for Magnetic Devices" (edition Wiley) page 408 etc. and in the "Application Note SMA 9" of the RCA Semiconductor and Materials Division. A short description only will therefore be given of the way in which the magnetic states of the cores in the matrix of FIGURE 1 are read out. The cores 115 and 115', which are allotted to the same bit, are always situated in adjacent columns. The reading wire allotted to this bit passes through the cores of these two columns in opposite sense, as is shown by the reading wire 114. If the word set in a row by means of a notched bar is to be read out, a current is caused first to flow in one direction through the selection wire 107 of this row. All cores in this row which have not been made inoperative by magnetizing them to saturation through the notched bar 111 will then be magnetized in a sense which corresponds to the direction of the current in the selection wire. If the direction of magnetization of a core is reversed by this current, a voltage pulse is generated in the reading wire 114. However, the reading circuit (not shown) is, inoperative at this moment. After this, a current is caused to flow through the selection wire 107 in a direction opposite to said one direction. Since all operative cores have been magnetized previously in a sense opposite to the sense corresponding to the direction of the current now flowing in the selection wire, the sense of the magnetization in all cores in the row which have not been made inoperative will be reversed. Thus voltage pulses are induced in the reading wire 114 passing through these cores. Depending on whether the one or the other of the two cores used for storing a certain bit has been made inoperative by the field flowing through a tooth of the notched bar allotted to the row, the voltage pulse induced in the reading wire for the bit will be either negative or positive since the reading wire 114 passes in opposite senses through the two cores for the same bit. The reading circuit is sensitive to the polarity of the voltages and establishes the reception of a 0-bit if it receives a voltage pulse of one polarity and that of a 1-bit if it receives a voltage pulse of the opposite polarity.

A matrix according to the invention can be wired as well as read out in other ways. The selection wires as well as the reading out wires can, for instance, be made to pass through the cores more than once.

The means described above for setting fixed registrations into a matrix is not restricted to matrices with two cores per bit. It can also be applied in matrices having only one core for each bit, either with or without bias wires (a matrix utilising one core per bit and bias wires is described in the book by R. K. Richards: "Digital Computer Components and Circuits" 1957, with reference to FIGURE 8–2(*b*) page 395) for maintaining a fixed exitation of all cores, as well as in matrices using other storing methods with two cores per bit, such as the methods described in the publication mentioned above and in Quartly: "Square Loop Ferrite Circuitry" (edition ILIFFE), chapter 5. In some of these types of matrices, the cores destined to store a word are distributed among two rows so that the fixed registration of such a word must be effected by means of two notched bars. The setting of a fixed registration in such a matrix is slightly more complicated than in a matrix in which a single notched bar corresponds to a complete word, but nevertheless the setting operation is considerably less complicated than the setting of all bits by means of separate magnets.

In FIGURE 1 only a single magnet 105 is situated below the moulded bar 104, but more than one may be used, if desired. It is, moreover, not necessary for these magnets to fill completely the space between the brass blocks 103. In a matrix having two cores per bit, it is only necessary to arrange the magnets in such positions that substantially equal fluxes reach the various notched bars.

Figure 2:
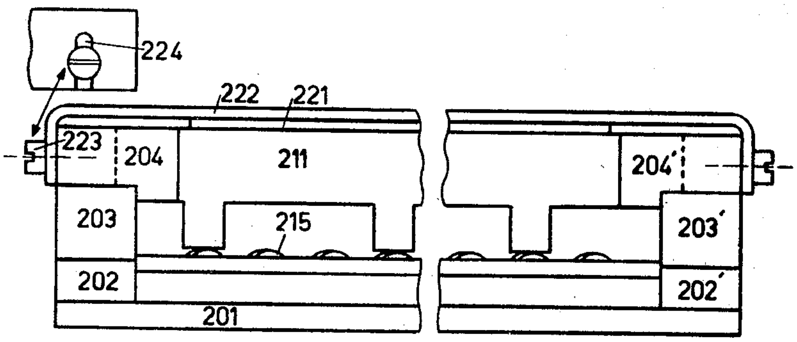
FIGURE 2 shows a front view of the matrix shown in FIGURE 1.

FIGURE 2 shows a front elevation of the matrix represented in FIG. 1. Corresponding parts are designated in FIGURE 1 and FIGURE 2 by reference numerals having the same last two figures. FIGURE 2 shows how the notched bars 211 are supported in slots of the moulded bars 204 and 204', each of the latter being located near one edge of the matrix. The bars 211 are retained in their slots by a lid 222 having turned-down edge portions which are secured to the bars 204 and 204' by means of screws 223 passing through slots 224. A layer 221 of resilient material, for example, foam plastic, is situated between the lid 222 and the bars 211 to prevent the latter from exerting a force on the cores sufficient to damage them.

Figure 3:
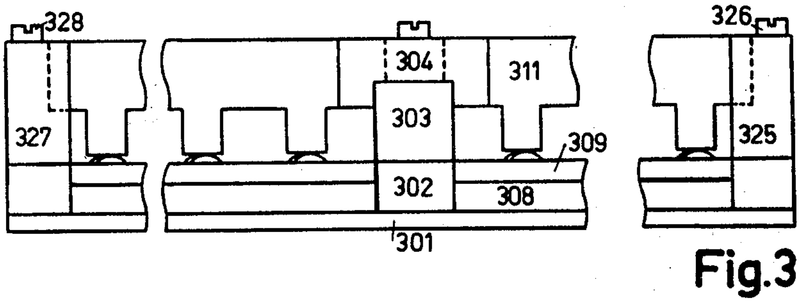
FIGURES 3 and 4 show a front and top view of another embodiment of a matrix according to the invention.
Figure 4:
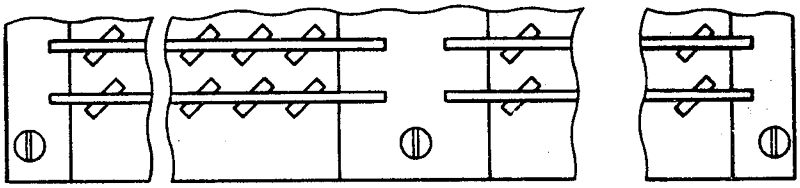

FIGURE 3 shows part of a front view of a matrix according to a further preferred embodiment of the invention in which the magnets are situated in the centre of the matrix. In this figure, element 301 is a soft iron bottom place and element 302 is a soft iron bar corresponding to the soft iron bar 102 in FIGURE 1. Element 303 is a brass block behind which a bar magnet is situated, while element 304 is a moulded bar which in this embodiment is provided with slots on either side. The bar 304 rests on the brass blocks 303 and notched bars 311 are supported in the slots of the bar 304. Bars 325 and 327 of plastics material are mounted on the bottom plate 301 parallel to the bar 302 and to the edges of the matrix by means of screws 326 and 328. The plastic bars 325 and 327 are provided with slots opposite the slots in the bar 304 to accommodate the ends of notched bars 311 opposite to the ends received in the slots of the bar 304. The slots in the bars 325 and 327 are cut so that the teeth of the bars 111 just touch the cores in the matrix. Unlike the bars 111 shown in FIGURE 1, there is no need to provide cut away portions 120 at the ends resting in the slots of the plastic bars to locate the bars at the required distance from the bottom plate 301. FIGURE 4 shows a plan view of the matrix of FIGURE 3.

As stated above, the magnets should provide a sufficiently strong field to make predetermined ones of the cores inoperative. However, the magnetic circuit, which includes the magnets, should not cause strong stray fluxes to endanger the correct operation of the cores which are to remain operative. In a matrix having two cores per bit, and in which each notched bar carries the same number of teeth, and the number of rows in which fixed registrations are present is always the same, the total reluctance of the magnetic circuits, for all possible combinations of words, has practically the same value so that the magnetomotive force of the magnets can be matched to this value. It becomes difficult, however, to provide a strong magnetic field and reduce stray flux if the number of rows in which fixed registrations are to be provided is not constant, and the remaining rows are to be used for the purpose of storing other than fixed registrations, so that the reluctance cannot be brought to a fixed value by mounting dummy bars in front of the rows in which no fixed registrations are present. Similar difficulties occur in matrices operating with only one core per bit. In these matrices it may be that for a certain combination of fixed registrations, the notched bars carry considerably more teeth than for other combinations. If the number of teeth is very large, the field in the inoperative cores may become too weak. Conversely, if the number of teeth is small, operative cores may be influenced by stray magnetic flux. Moreover, in the case of a matrix with only one core per bit, the number of teeth carried by the various bars will be different. Consequently, saturation may occur in a notched bar with a large number of teeth with the result that the field supplied by this bar becomes too weak. In contrast, a bar with a small number of teeth may generate such strong stray fluxes that certain operative cores in its vicinity become unreliable in their operation.

The above difficulties may be substantially overcome by the application of magnetic shunts. If the number of teeth on the various bars is equal or at any rate does not differ too much, and the difficulties are the result of the matrix not including under all circumstances the same number of notched bars, and/or the total number of teeth present on all the bars depends on the combination of words to be stored, good results can be obtained by means of magnetic shunts, which provide a substantially direct connection between the poles of the magnets which produce the flux. Such a shunt may comprise, for example, a screw received within a threaded bore in a moulded bar such as the bar 104 shown in FIGURE 1. The screw then is arranged to protrude into part of the space between the bars 104 and 102 which is not occupied by a magnet. The screw thus provides a magnetic shunt for adjusting the reluctance of the magnetic circuit between the poles of the magnet or magnets.

Figure 5:
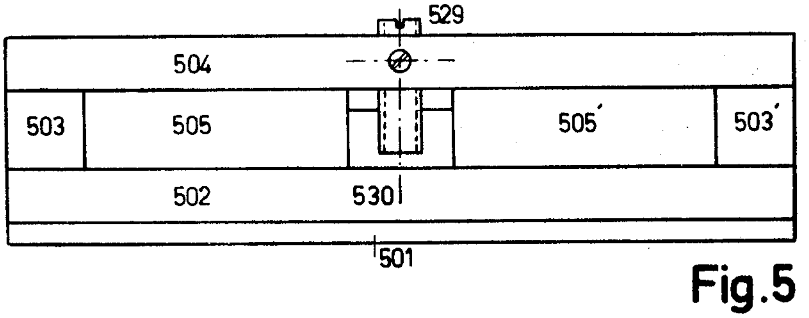
FIGURES 5 and 6 show embodiments of magnetic shunts which can be applied in matrices according to the invention.

FIGURE 5 shows a side view of a matrix provided with such a shunt. In this figure element 501 is the soft iron bottom plate to which is secured bar 502. The plate 501 and bar 502 are similar to the plate 101 and bar 102 described before with reference to FIGURE 1. Two brass blocks 503 and 503′, similar to block 103 in FIGURE 1, have mounted thereon a slotted bar 504. Two permanent magnets 505 and 505′ magnetized in a direction transverse to the bottom plate 501, are clamped between bars 504 and 502. A soft iron screw 529 is received within a bore in the bar 504 for vertical adjustment relative to the bar 502. A narrow air gap is left between the lower end of the screw 529 and the bar 502 to provide a relatively low reluctance path that may divert a relatively large part of the magnetic field produced by the magnets 505 and 505′. A small set screw locks the screw 529 in any desired position. Preferably the matrix is provided with a magnetic shunt at either side. Other well-known construction of magnetic shunts can be used.

If the number of teeth on the various notched bars differs substantially, then it may be desirable to locate the magnetic shunts on the bars themselves, so that the differences in their reluctances can be compensated for.

Figure 6:
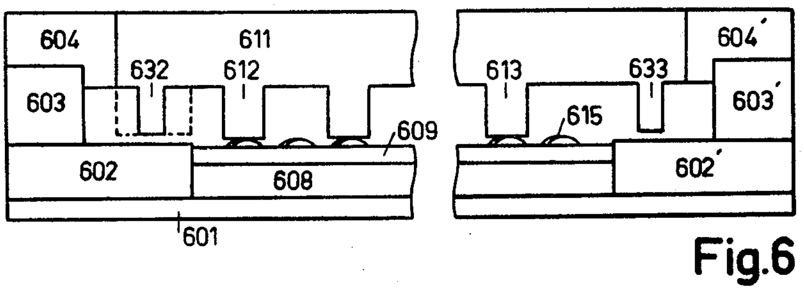

FIGURE 6 shows a matrix according to a further preferred embodiment of the invention in which the parts referenced 601, 603, 604, 608, 609 and 615 are similar in construction and composition to the parts 101, 103, 104, 108, 109 and 115, respectively, as described with reference to FIGURE 1. However, although the bars 602 and 602′ are similar in construction, and may be identical in composition to the bars 102 shown in FIGURE 1, the former are substantially larger in width than the latter. As a consequence, bars 602 and 602′ partially extend below the notched bar 611, which is similar to the bar 111 of FIGURE 1, to constitute pole pieces for the magnets situated behind the brass blocks 603 and 603′. Special shunt teeth 632 and 633 are provided on the notched bars 611 so that, upon insertion of the latter in the slots in the bars 604, the former are located opposite the pole pieces formed by the bars 602 and 602′ to constitute therewith magnetic shunts for magnetic fields which are induced through the bars 611 in the cores adjacent the other teeth of that bar. Stock bars 611, which have not been prepared for setting a word in a predetermined row of a matrix, have a shunt tooth having the greatest possible width or length near either end. Such a tooth is shown by the dotted line near the tooth 632 in FIGURE 6. If a large number of the teeth 612 are to be removed for providing a predetermined pattern of fixed registrations constituting a word in one row of a matrix, then the shunt teeth 632 and 633 are left as shown by the dotted line in FIGURE 6. As the number of teeth 612 left on the bar 611 becomes larger, a larger part of each of the magnetic shunt teeth 632, 633 is removed. The reduction of the dimensions of these magnetic shunt teeth can be effected either by making them narrower, as has been described above, or by making them shorter. This reduction in dimensions can be effected by a cutting or punching device that is similar to that used for removing the teeth 612 which carry flux to the cores.

As a rule it will suffice to provide a bar with shunt teeth of equal breadth or equal length at both ends thereof, but if it is so desired, the length of the breadth of the magnetic shunt teeth can be altered in accordance with the distribution of the teeth on the notched bar, the broadest or the longest magnetic shunt tooth being present at that end of the bar on which the smallest number of teeth is maintained. A bar provided with magnetic shunt teeth can also be made from a complete strip by punching or cutting notches therein to provide the teeth, and by removing small portions from the ends of the bar to provide the cut away portions 120, shown on the bar 111 in FIGURE 1. The dimensions of the magnetic shunt teeth can then be suited to the number of teeth maintained on the bar by removing parts of those teeth as described above.

In a matrix using notched bars having magnetic shunt teeth, it is not necessary to employ bars such as 602 and 602′ which project inwards of the edges of the matrix and beyond the permanent magnets located behind the brass blocks 603 and 603'. If the plastic layer 608 includes fine iron powder or the like, then a magnetic shunt tooth can establish a path for the magnetic shunt field with a sufficiently low reluctance through the plastic layer without a soft iron pole piece being situated under the shunt teeth. However, the width of the magnetic shunt teeth will then have to be a little larger.

Various changes can be made in the construction of the matrices hereinbefore described without departing from the scope of the present invention. Some of the changes which are possible are described below.

In the embodiment according to FIGURE 1, it is assumed that the projections hereinbefore referred to on the underside of the layer 108, when pushed into the openings 118 in the bottom plate 101, prevent the layer separating from the bottom plate. Furthermore, it is assumed that the layers 108 and 109 are kept together by the plastic material around the recesses and openings therein clinging to the cores. Should movement of these layers perpendicular to the bottom plate 101 nevertheless occur, then it is possible to hold them in place by means of glue. This has, however, the disadvantage that it is very difficult to take the matrix apart for repair. To prevent movement of the layer 108 relative to the bottom plate 101, and movement of the layers 108 and 109 relative to themselves, the layers may be clamped under a rectangular metal frame that exactly fits within the boundaries of the layers. The frame then is fixed by means of screws to the bottom plate 101 near those edges thereof which are perpendicular to the bar 102.

The bars 102 may be replaced by grooved strips of plastic material containing finely distributed iron powder or iron compound powder, the grooves providing passages for the selection wires 107. This construction, however, has the disadvantage that the reluctance of the plastic material is higher than that of a soft iron rod, but it has the advantage that the insulation of the wires 107 is not likely to be damaged so easily so that the grooves may be made narrower. Also, the plastic strip being resilient and deformable can be clamped in more intimate contact with the magnet 105 and the bottom plate 101 then a soft iron bar such as 102 to avoid air gaps in the magnetic circuit.

The soft iron bottom plate 101 may be completely enclosed in the layer of plastic material 108. Openings are provided in the plate through which connections between each part of either side of the plate may be established, thus preventing these layers from losing contact therewith. Such connections are superfluous if the plastic material from which the layer 108 is made adheres sufficiently to iron. This latter form of matrix has the advantage that the number of parts of the matrix is reduced and the magnetic contact between the layer 108 and the plate 101 will be better.

The plate 101 may be replaced by strips of material of high magnetic permeability such as a transformer lamination. The strips are embedded in the plastic layer near each row of cores to provide a return path for the magnetic fields passing through the cores. Alternatively, soft iron wires may be embedded in the plastic layer.

If strips or wires embedded in a layer of resilient magnetically permeable plastic material are used instead of the plate, the resiliency of that part of the layer supporting the cores can be increased by locating the strips or wires on either side of the rows. The displacements of the cores when inserting the notched bars are then less restricted by the presence of the strips or wires. It is not necessary for the notched bars to be straight, although in general this is desirable.

A further modification which can be made to the matrix described with reference to FIGURE 1, or to the modifications thereof described above, is to make the bottom plate 101 from a similar material to the layer 108 so that together they constitute a single unit. However, the layer 108 should preferably be resilient and thus the amount of iron powder in it is restricted, which has an unfavourable influence on the magnetic permeability of the layer. However, the layer which replaces the bottom plate 101 need not be resilient so that it may contain a much larger percentage of iron powder and consequently can have a much higher permeability. To make the matrix rigid the two layers may be supported on a rigid plate, such as a pertinax plate.

In the foregoing description, the term fixed registrations means registrations which cannot be set into or removed from the matrix by the system to which the matrix is connected. It does not mean registrations which are made in the matrix when it is built and remain in it during its complete life. Fixed registrations as hereinbefore defined can be changed by inserting other notched bars into the matrix to comply with a change in programme of the system to which the matrix is connected, or to enter different data for a particular programme.

What I claim is:

1. A magnetic core storage matrix comprising a plurality of magnetic cores composed of a material exhibiting a high coercive force and arranged in groups, a plurality of drive lines linking said cores for setting one or more of the cores, a plurality of read-out lines linking the cores each for sensing a change in the magnetic state of one or more of said cores, at least one relatively thin notched bar having one or more teeth and composed of a material having high magnetic permeability, said bar being positioned to one side of said core matrix adjacent a predetermined group of cores so that the teeth project adjacent predetermined cores in said group of cores, a magnetic circuit including said notched bar and a member having high magnetic permeability positioned on the opposite side of said core matrix and extending along the matrix in the close vicinity of the cores, said magnetic circuit forming a low reluctance magnetic flux path for said predetermined cores, and magnetizing means located between said bar and said member for inducing a magnetic flux in said circuit for causing said notched bar to disable the cores adjacent the teeth in said bar.

2. A magnetic core storage matrix according to claim 1 wherein said magnetic circuit further comprises at least one supporting bar composed of a material having a high magnetic permeability and containing at least one slot which is transverse to the matrix, each notched bar resting with at least one end in a slot of a supporting bar.

3. A magnetic core storage matrix according to claim 1 wherein the means for inducing a magnetic flux comprise at least two magnets that are mounted near two opposite edges of the matrix and beyond the area of the matrix in which the cores are located, said magnets being mounted with like pole facing said member having high magnetic permeability.

4. A magnetic core storage matrix as claimed in claim 3 in which the cores are arranged in rows, a number of slotted supporting bars of high magnetic permeability mounted near said two opposite edges of the martix at which said magnets are mounted and arranged so that low magnetic reluctance paths are provided between each supporting bar and the magnet poles not facing said member having high magnetic permeability, each slot in a supporting bar being aligned with a row of cores, each notched bar being inserted in slots aligned with the same row and present in supporting bars near opposite edges of the matrix so as to be supported in a position in which said teeth are adjacent said predetermined cores in said row.

5. A magnetic core storage matrix as claimed in claim 1 further comprising at least one adjustable magnetic shunt member bridging that part of the magnetic circuit that passes through the teeth of the notched bars and the cores adjacent thereto.

6. A magnetic core storage matrix according to claim 1 wherein said notched bar includes at least one tooth located at a position in the matrix where no core is present thereby constituting a magnetic shunt that bridges a portion of the magnetic flux passing through the teeth of the bar and their adjacent cores.

7. A magnetic core storage matrix as claimed in claim 1 wherein the member having high magnetic permeability comprises a soft iron plate.

8. A magnetic core storage matrix as claimed in claim 2 wherein said magnetizing means comprises at least two magnets mounted near two opposite edges of the matrix and outside the area of the matrix in which the cores are located, said magnets being mounted with like poles facing said high permeability member.

9. A magnetic storage device comprising a plurality of magnetic storage cores arranged in a plane having an upper side and a lower side, input and output winding means linking said cores, and means for disabling selected ones of said cores comprising, a plurality of notched bars of high magnetic permeability mounted at the upper side of said core plane and containing teeth aligned with the selected cores and projecting in close proximity thereto, a plate composed of a material having high magnetic permeability and extending along the lower side of the core plane and parallel thereto, and magnetic circuit means for providing a low reluctance path between said plate and said notched bars, said magnetic circuit means including magnetizing means for causing a magnetic flux to flow in a path that includes said magnetic circuit means, said notched bars, said selected cores and said plate, and at a level approaching saturation of the selected cores.

10. A storage device as claimed in claim 9 wherein said magnetizing means comprises two permanent magnets mounted adjacent two opposite edges of the core plane and outside of the area in which the cores are located.

11. A storage device as claimed in claim 9 further comprising an adjustable magnetic shunt member arranged to provide a parallel flux path between said notched bar and said plate that includes an air gap that can be varied with the adjustment of said shunt member.

12. A storage device as claimed in claim 9 wherein a notched bar includes a tooth projecting towards said plate and located in a space in the device which is devoid of any cores.

13. A storage device as claimed in claim 10 wherein said cores are arranged in rows perpendicular to said two opposite edges of the core plane, said magnetic circuit means including first and second support bars composed of a magnetically permeable material and having slots therein aligned with individual rows of cores, said support bars being positioned adjacent said two opposite edges of the core plane with their slots aligned so as to support said notched bars therebetween.

References Cited

UNITED STATES PATENTS 3,140,403 7/1964 Morwald ------------ 307—88
3,263,221 7/1966 Van Der Hoek ------ 340—174

STANLEY M. URYNOWICZ, Jr., Primary Examiner

PO-1050
(5/69)

UNITED STATES PATENT OFFICE
CERTIFICATE OF CORRECTION

Patent No. 3508214 Dated April 21, 1970

Inventor(s) GERHARDUS BERNARDUS VISSCHEDIJK

It is certified that error appears in the above-identified patent and that said Letters Patent are hereby corrected as shown below:

Column 2, line 16, after "a" (second occurence), insert --notched bar--

Signed and sealed this 1st day of Sept. 1970.

(SEAL)
Attest:

Edward M. Fletcher, Jr.
Attesting Officer

WILLIAM E. SCHUYLER, JR.
Commissioner of Patents